United States Patent

[11] 3,617,281

| [72] | Inventor | Gregory E. Lindin<br>Wellesley Hills, Mass. |
|---|---|---|
| [21] | Appl. No. | 6,991 |
| [22] | Filed | Jan. 30, 1970 |
| [45] | Patented | Nov. 2, 1971 |
| [73] | Assignee | Polaroid Corporation<br>Cambridge, Mass.<br>Continuation-in-part of application Ser. No. 547,251, May 3, 1966, now Patent No. 3,504,970. |

[54] PRINTING OF LENTICULAR FILMS
3 Claims, 7 Drawing Figs.

[52] U.S. Cl. ........................................................ 96/40,
96/118, 96/26, 96/81
[51] Int. Cl. ........................................................ G03c 9/00
[50] Field of Search .......................................... 96/40, 81,
118, 26

[56] References Cited
UNITED STATES PATENTS

| 1,918,705 | 7/1933 | Ives | 96/81 X |
| 2,125,162 | 7/1938 | Heymer | 96/81 |
| 1,984,471 | 12/1934 | Fischer | 96/81 |
| 2,794,739 | 6/1957 | Gretener | 96/26 |
| 2,829,051 | 4/1958 | Gretener et al. | 96/26 X |

Primary Examiner—David Klein
Attorneys—Brown and Mikulka and Sheldon W. Rothstein ABSTRACT: A selected portion of a photosensitive element comprising a lenticular surface may be exposed by forming said element into an arc while said element is moving through an exposure area and exposing said photosensitive element to a source of radiation actinic thereto, said source being so placed as to be incident only upon a preselected portion of said photosensitive material.

INVENTOR.
Gregory E. Lindin
BY
Brown and Mikulka
and
Sheldon W. Rothstein
ATTORNEYS

PRINTING OF LENTICULAR FILMS

This application is a continuation-in-part of copending U.S. application Ser. No. 547,251, filed on May 3, 1966 in the name of Gregory E. Lindin, now U.S. Pat. No. 3,504,970.

The present invention relates to photomechanical printing methods and apparatus and, more particularly, to photomechanical printing methods and apparatus for making color screen elements.

The copending U. S, application of Edwin H. Land, Ser. No. 276,785, filed Apr. 30, 1963, discloses now U.S. Pat. No. 3,284,208 processes for preparing additive color screen elements wherein a plurality of photoresponsive or photosensitive layers are applied over one another on the flat side of a lenticular film and small e.g., about 0.6 mil in width) nonoverlapping areas of each layer after their application and before the application of the next layer are selectively exposed and dyed to provide a color screen.

In the color screen elements formed by means of the aforementioned Land application, the dyed areas of which the screen is comprised are elongated lines of dye extending either longitudinally or transversely of the longitudinal axis of the completed screen. For use in the production of "still" photographs, either type may be effectively used. However, the longitudinally extending dyed areas are less preferred for "motion" pictures as they tend to create longitudinal lines on the projection screen as the "motion" picture is being shown. These longitudinal lines are objectionable to the viewer and have made the use of this type of color "motion" picture film undesirable. The use of transverse dyed areas, however, overcomes this objection.

In the preparation of "motion" picture film of any type, it is desirous that the manufacturing operation be accomplished in a rapid and continuous manner so as to keep the cost of the film as low as possible. Therefore, and in accordance therewith, it was undertaken to provide methods and apparatus for production, in an efficient, rapid and continuous manner, color screen elements wherein the dyed areas extend transversely of the length of the web.

Therefore, it is an object of the present invention to provide methods and apparatus for selectively exposing to light portions of a photoresponsive layer contiguous with the smooth surface of each lenticule of a moving lenticular photoresponsive element for the production of color screen elements wherein each colored area of the screen extends transversely of the longitudinal axis of the color screen element.

Other objects of the invention will in part be obvious and will in part appear hereinafter.

Therefore, and in accordance with the present invention, a method for selectively exposing to light a portion of a photoresponsive layer contiguous with the smooth surface of each lenticule of a moving lenticular photoresponsive element, wherein each lenticular axis is perpendicular to the direction of motion, is provided by forming the lenticular photoresponsive element into an arc, whereby the lenticular surface of the element is directed inward of the circle comprising said arc and the optical axis of the lens element of each lenticule is directed toward the center of the circle during passage of the lenticule through the arc, and exposing the selected portion of said layer contiguous with each lenticule, during its traverse through said arc, from a source of radiation actinic to said photoresponsive layer intermediate the circumference of the aforementioned circle. The present invention also relates to apparatus particularly adapted for carrying out the method of the present invention.

The invention accordingly comprises the method involving the several steps and the relation and order of one or more of such steps with respect to each of the others and the apparatus possessing the construction, combination of elements and arrangement of parts which are exemplified in the following detailed disclosure, and the scope of the application of which will be indicated in the appended claims.

For a fuller understanding of the nature of the invention, reference is had to the following description taken in conjunction with the accompanying drawings in which.

Figure 1:
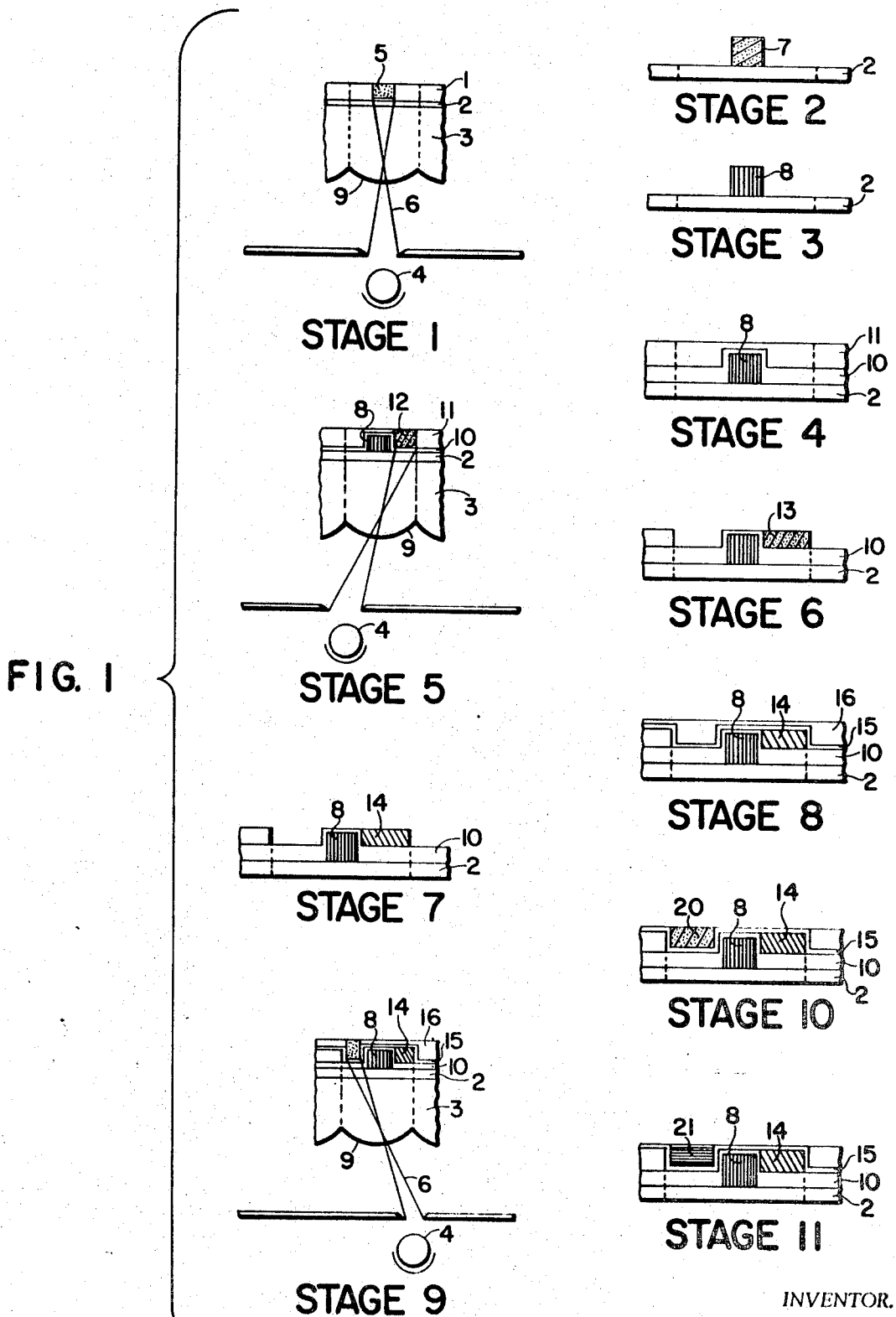
FIG. 1 is a diagrammatic cross-sectional view illustrating the various stages in a photomechanical printing process as disclosed in said aforementioned copending Land application.

The process disclosed in the above-mentioned copending Land application for forming color screens may best be illustrated by referring to FIG. 1 of the present application which is a diagrammatic cross-sectional view illustrating the various stages in one embodiment of such process. In Stage I of said FIG. 1 there is shown a lenticular photoresponsive element comprising a lenticular film 3, an adhesive layer 2 (in the preferred embodiments), and a photoresponsive layer 1, such as a potassium, sodium or ammonium dichromate sensitized gelatin layer. From a source of radiation 4, which is preferably a source of ultraviolet radiation, rays 6 of radiation, actinic to photoresponsive layer 1. For the production of the generally preferred trichromatic additive color optical filter screens, the exposure area 5 usually comprises approximately one-third of the photoresponsive layer contiguous to each lenticule 9, although, as will be recognized, the exposure area will be determined, in general terms, by the number and relative size of the individual, colored optical filter units to be formed contiguous with each lenticule. When desired, as is well understood in the art, such exposure areas 5 may be increased or decreased depending on factors such as the intensity of the filter dyes, etc., In the particular instance depicted, the central portion of photoresponsive layer 1 has been optionally selected to comprise the area exposed in Stage 1.

In the following stages, with the exception of stages 5 and 9, lenticular film layer 3 of the lenticular element has been deleted from the drawing for ease of explanation.

Subsequent to photoexposure, in Stage 2, the element is contacted with water or other suitable solvent to effect removal of unexposed portions of photoresponsive layer 1, in accordance with the selected exposure pattern, and to provide thereby formation of a resist comprising exposed areas 7.

In Stage 3, the element, now comprising exposed areas 7, is contacted with a dye solution, comprising a dye substantive to the resist 7, e.g. a primary red color acid dye, to provide first formed optical filter elements 8.

In Stage 4, the element is coated with a second adhesive layer 10. Subsequent to drying, a second photoresponsive layer 11 is then overcoated on adhesive layer 10.

In Stage 5, the element is exposed to radiation 6 from exposure source 4 at such an angle from the optical center line of the lenticule as to provide a second exposure area 12 in photoresponsive layer 11. Area 12, in the depicted preferred embodiment, is equal to approximately one-third of the surface area of the respective lenticule 9 immediately adjacent photoresponsive layer 11, in extent, to that of preceding optical filter element 8.

Subsequent to photoexposure, in Stage 6, the element is contacted with a solvent, as previously described, to effect removal of unexposed photoresponsive layer 11, in accordance with the selective exposure pattern, and provide resist 13.

The element in Stage 7 is contacted with a dye solution containing a dye substantive to resist 13, e.g. and acid dye of green coloration, to provide second optical filter elements 14.

In Stage 8, the element, now containing a first and second series of optical filter elements, is coated with a third adhesive lacquer layer 15 which, subsequent to substantial drying, is overcoated with a third photoresponsive layer 16.

The element is then exposed, in Stage 9, to radiation 6 from exposure source 4 at such an angle from the optical center line of the lenticule so as to effect exposure of area 17 of photoresponsive layer 16 or, alternatively, to diffuse radiation effectively filtered by previously formed optical filter elements 8 and 14.

Subsequent to photoexposure the element is contacted with water in Stage 10, as previously described, to effect removal of unexposed photoresponsive layer 16, in accordance with the exposure pattern, and provide resist 20.

In Stage 11, the element is contacted with a dye solution containing a dye substantive to resist 20, e.g. an acid dye of blue coloration, to provide third optical filter elements 21.

Figure 2:
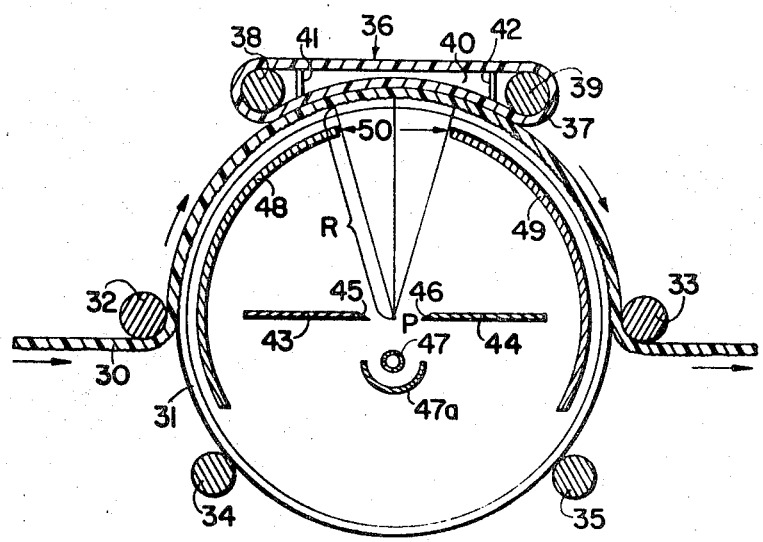
FIG. 2 is a diagrammatic cross-sectional view of an apparatus, in accordance with the present invention, arranged for selectively exposing the central portion of a photoresponsive layer contiguous with each lenticule.

Referring to FIG. 2, there is shown a diagrammatic cross-sectional view of an apparatus in accordance with the present invention, particularly adapted for selectively exposing the portions of the photoresponsive layer in accordance with the process of the present invention, to provide a color screen. A lenticulated photoresponsive element 30 is conveyed at constant speed over circular edge guides 31 at the lateral margins of the element (one not being shown due to the cross-sectional view) to shape the element into an arc, the lenticular surface being directed inward of the circle comprising the arc. Rollers 32 and 33 maintain the element in constant tension against the edge guides 31 to prevent buckling of the element 30. These rollers may also provide some of the motive power necessary to move the element through its arcuate path but this is less desirable as it might cause buckling of the element 30. The edge guides 31 may be in the form of metallic, plastic, or glass rings which are mounted on roller 34 and 35 which allow the rings to rotate as the element 30 is advanced through the device though the rollers may be eliminated as desired. As with rollers 32 and 33, rollers 34 and 35 may also provide motive power to assist in the movement of the element 30 through the device. The means to motivate these rollers, such as motor, pulleys, gears, etc. are not shown as they would be obvious to one skilled in the art of mechanics. A curved vacuum belt device 36 serves to support the center of the element 30 in precise relation to the circular edge guides 31 so that the entire surface of the lenticulated element 30 is maintained substantially in the desired arcuate path. The vacuum belt device 36 also acts in the form of the invention to maintain the speed of element 30 through the device at a substantially constant value. The vacuum belt device 36 may comprise an air permeable rubber belt 37 which is transported by rollers 38 and 39. A vacuum chamber 40 is formed between the two rollers 38 and 39, for example, by partition elements 41 and 42. A source of vacuum (not shown) is connected to the chamber to provide the vacuum. As with the previously mentioned roller elements, motive power means may be attached to the rollers 38 and 39 to effect movement of the belt 37.

If desired, the edge guides 31 can be in the form of a hollow, cylindrical transparent tube of glass or plastic and the supporting function of the edge guides and the vacuum device could be accomplished solely by the tube. If rotary motive power were then applied to the tube, the tube can then act to transport the lenticulated photoresponsive element 30 through the apparatus which would then obviate the desirability of the curved vacuum belt or the like device 36.

Positioned within the circle previously described are exposure means which means provide the actinic radiation necessary to expose the desired portion of the photoresponsive layer contiguous with each lenticule. The exposure means preferably comprise an elongated or line actinic radiation source, and most preferably includes adjustable aperture plates 43 and 44 and light source 47.

Aperture plates 43 and 44 are opaque and may comprise metal or plastic plates with beveled portions 45 and 46, the pointed ends of the bevels being on the lower edge of the plates, that is, the edge of each plate next adjacent light source 47. These plates are mounted so as to be adjustable toward or away from each other to vary the aperture therebetween. The plates are also mounted so as to allow the aperture to be varied from one side to the other side of a line drawn perpendicular thereto and passing through the center of the defined circle. Both motions are preferably in the same lateral plane for simplified control purposes. The aperture plates may also be mounted for movement perpendicular to the lateral plane, as will be explained more fully hereinafter.

Positioned below the aperture plates is light source 47, preferably an ultraviolet light source. The light source may be mounted to move by itself or to move in cooperative movement with the movement of the aperture plates as desired. The light source may also be from incandescent bulbs, either alone or with filter elements attached thereto, such as to filter out various colors from the light to provide, for example, a monochromatic light source. Any other source of energy which will effect exposure of the photoresponsive element may also be used. In this connection, and where a source of intense radiation is desired, a source providing electron beams, laser beams, maser beams, or the like, radiation may be utilized. The source may include various intensifiers such as reflectors (47A), or other such equipment as desired.

It is noted that the aperture plates and the light source may be integral such as a coated luminescence tube which is opaque except in a thin narrow linear area so as to proved an apertured light source.

Included within the arcuate area defined by the moving photoresponsive element, and preferably slightly therebeneath are two opaque circular baffle plates 48 and 49 which act to define an exposure area 50 therebetween. These baffles are opaque to light and may be mounted for movement toward or away from each other along a circular path defined by their curved surfaces so as to vary to exposure area 50. The baffle plates 48 and 49 may be mounted for simultaneous movement so as to define a symmetrical exposure area or they may be mounted for individual movement. The baffle plates may serve to prevent light from the light source 47 from reaching the photoresponsive element 30 as it enters the apparatus as this may cause some fogging of the photoresponsive element. The baffles also can serve as light attenuators which allow one to vary, in a simple manner, the amount of light reaching the selected photoresponsive element to thereby allow for varying degrees of film speed (photoresponsiveness) and differences in transport speed of photoresponsive elements through the exposure zone. As will be obvious, on could use separate baffle plates and light attenuators as desired. The baffle plates 48 and 49 also may serve another and more important function, e.g., that of controlling or defining the exposure area, the significance of which will be more apparent in connection with the optical discussion which follows.

Since the baffle plates and the aperture plates both delineate the zone of radiation incident on the photoresponsive element, the function of the two sets of plates can be combined in either the baffle plates or the aperture plates thereby eliminating the provision for the separate elements described. However, it is desirable that both sets of plates be employed as adjustment of the apparatus for specified imaging is more easily accomplished.

The theory upon which the method and the apparatus of the present invention are based will now be more fully discussed in connection with the optical diagram of FIG. 3 which is illustrated in an exaggerated scale for ease of explanation.

The instant discussion will be initially directed to the specific detailed theory first set forth so that the broader theory of the present invention presented thereafter may be more easily understood. In connection with this discussion, there will be detailed two specific methods of accomplishing the results of the present invention, both of which utilize the apparatus described hereinbefore. It is to be understood that the following discussion is based on optical diagrams which have been simplified and set forth schematically for purposes of clarity.

Figure 3:
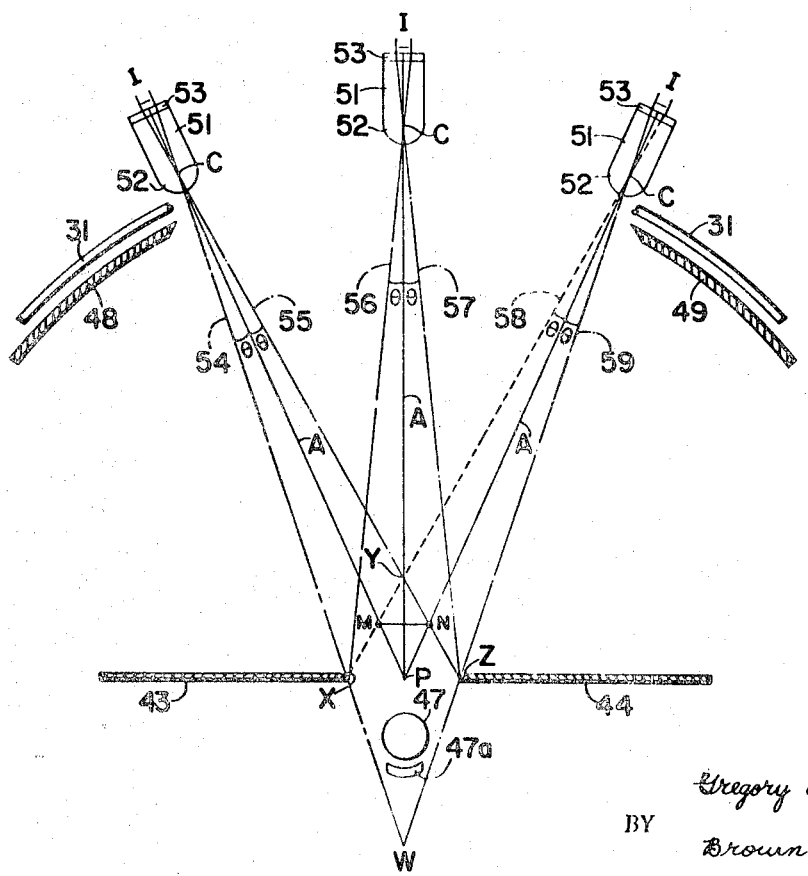
FIG. 3 is a schematic optical diagram, on exaggerated scale, showing the optics of an apparatus of the present invention and particularly directed to the optics of the apparatus shown in FIG. 2.

Referring to FIG. 3, an optical diagram is shown indicating the light imaging taking place within a single lenticule 51 of the photoresponsive element 30 as it moves through an exposure area as defined by the area between baffle plates 48 and 49. For purposes of discussion, three exposing positions of the lenticule, left, center and right, are shown to indicate the exposing action which takes place as the lenticule moves through the complete exposure area. The photoresponsive element 30, for purposes of this discussion, comprises a lenticule 51 having an outwardly curved surface 52 which forms a converging lens element, the back or rear surface of the lenticule 51 being coated with a photoresponsive layer 53. The light imaging is accomplished by an actinic radiation source comprising a light source 47 and aperture plates 43 and 44 positioned thereover. This actinic radiation source shown for purposes of illustration is so positioned as to effect the photoexposure of the central approximate one-third area of the photoresponsive layer 53 contiguous with the lenticule 51 and this central one-third area is indicated by image area I. The manner of the positioning of the actinic radiation source to effect the desired photoexposure will be discussed hereinafter.

Referring more particularly to FIG. 3 and assuming that the motion of the photoresponsive element 30 which is travelling through the apparatus discussed hereinbefore is stopped, let us review the optics taking place within the lenticule on the left-hand side of the figure to effect the photoexposure of the central one-third area of the photoresponsive layer 53 of lenticule 51. As is well known, light rays or image rays issuing from a source will, in a converging lens system, travel from the outermost points of the light source through the center of curvature C of the lens (point of non divergence) in a nondeviated or straight path to produce a reverse image behind the lens.

This illustrative image area denoted by I, covers the central one-third portion of the area of the photoresponsive layer contiguous with the lens element of the lenticule, which area is divided into two equal parts by the optical axis line A of the lens element. This optical axis line is a straight line through the center of curvature of the lens which divides the lens into two symmetrical parts, and by forming the lenticulated photoresponsive element 30 into an arc as it moves through the exposure area each optical axis line of each lenticule is directed toward point P, the center of the circle of which the arc is a part. In the diagram of FIG. 3, optical light lines 54 and 55 have been drawn from the outermost points of the image area I, of the lenticule on the left-hand side of the figure through the center of curvature C of the lens to a plane which contains the center of the circle of which the arc is a part, which plane is also perpendicular to a radius dropped from the photoresponsive element while the element is in the exposure area. Aperture plates 43 and 44 are positioned on this plane and the distance between the optical light lines 54 and 55 at the point of contact with this plane determines the position and extent of the aperture openings between the plates necessary to effect the desired photoexposure. It will be noted, by reference to the diagram, that by forming the lenticulated photoresponsive element 30 into an arch as it moves through the exposure area that the optical axis line of each lenticule is directed toward point P, the center of the circle of which the arc is a part.

Now let us consider the relationship between light lines 54 and 55 as drawn from the light source through the center of curvature C of the left lenticule and the optical axis line A of its lens. The light rays 54 and 55 each form an angle with the optical axis line which angle is denoted $\theta$.

Assuming that the optical axis line divided the image area in half, each light line 54 and 55 will also be equidistant therefrom. Since the optical axis line A passes through point P and also the center of curvature C through which the light lines 54 and 55 also pass, the light lines 54 and 55 will remain equidistant from each other and from the optical axis line A until they reach the aperture plates 43 and 44. Therefore, the angle formed between the divergent light lines and optical axis line will be equal or in other words the optical axis line will bisect the angle formed by the divergence of light lines 54 and 55. Since the optical axis line passes through point P, the aperture plates 43 and 44 positioned on the plane which contains point P and which are separated from each other by a distance determined by the light lines 54 and 555 when those lines reach the plane, the aperture plates should be spaced equidistant from point P and from each other. In other words, if the image area I, is symmetrical about the optical axis line A, the light source will also be symmetrical about the same line.

The lenticule 51 is now moved to the center of the diagram assuming that nothing else is changed. As before, light lines are drawn from the outermost points of the image area I, through the center of curvature C of the lens, which lines are denoted by numerals 56 and 57. In tracing these lines toward the plane containing the center of the circle, these lines contact the outermost points of the aperture plates 43 and 44 and also lines 54 and 55 upon reaching the plane. This is true, since, and in accordance with the previous discussion, the angles formed between each light line 56 and 57 and the optical axis line A are equal to each other and to the angles formed by the light lines 554 and 55 of the left lenticule and its optical axis line and hence are also denoted by $\theta$. Since the distance between the center of curvature C and the center of the circle P has remained the same, the aperture opening between the plates 43 and 44 required to produce the desired photoexposure of image area I has also remained the same.

In moving the lenticule 51 to the right hand side of the diagram, a similar situation also exists so that the same discussion given hereinbefore is also applicable. This can be seen by a study of light lines 58 and 59 which travel from the outermost points of image area I, through the center of curvature C to the aperture plates 43 and 44.

It is noted that the light source or image is defined by the opening between aperture plates 43 and 44 by the lenticule in its full width when the lenticule is directly above it, e.g., when the optical axis of the lenticule is perpendicular to the plane of the aperture plates. On either side of that point, the image area exposed appears to progressively contract to a limited extent due the the angle at which the light source is imaged, though the imaging is still symmetrical about the optical axis line. For the present, this phenomenon will be disregarded since its effect is negligible and proper exposure of the entire desired area will be accomplished by the movement of the lenticule through the exposure area.

It is apparent from the foregoing discussion that a similar imaging will occur at any point throughout the arc. Since the imaging can be controlled as explained hereinbefore, it is possible to pass the lenticulated photoresponsive element 30 through the machine without exposing the photoresponsive layer overall but only exposing those areas desired to be exposed by adjustment of the opening between aperture plates 43 and 44. As can be seen from the foregoing discussion, the operation of the present invention is based on the forming of the lenticulated photoresponsive element into an arc and that the optical axis line of each lenticule must be directed toward the center of the circle of which the arc is a part.

The foregoing discussion has been related to the optics of exposing the central approximate one-third of the area of the photoresponsive layer contiguous to the lenticule. This is in accordance with Stage 1 of FIG. 1 and Stage 1 of the process disclosed in the aforementioned Land application Ser. No. 276,785. The optics of exposing the right one-third (Stage 5) and then the left one-third (Stage 9) will now be discussed.

Figure 4:
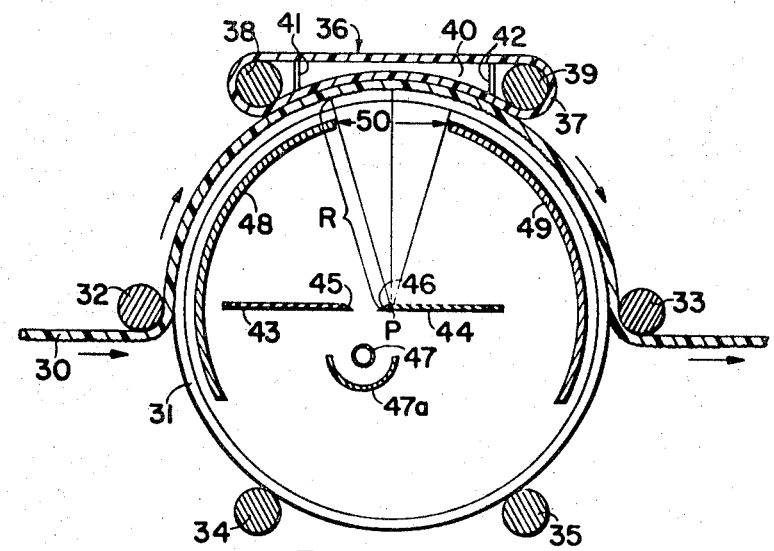
FIG. 4 is a diagrammatic cross-sectional view of the apparatus of FIG. 2 arranged for selectively imaging the right portion of a photoresponsive layer contiguous with each lenticule.

Referring first to FIG. 4, there is shown a cross-sectional view of the apparatus of the present invention similar to that of FIG. 2. The only difference between the two figures is that the aperture plates 43 and 44 and the light source 47 have been moved laterally to a position to the left of the central point P. In this position, the right approximate one-third of the photoresponsive layer 53 will be exposed To understand this operation, reference is made to the optical diagram shown in FIG. 5.

Figure 5:
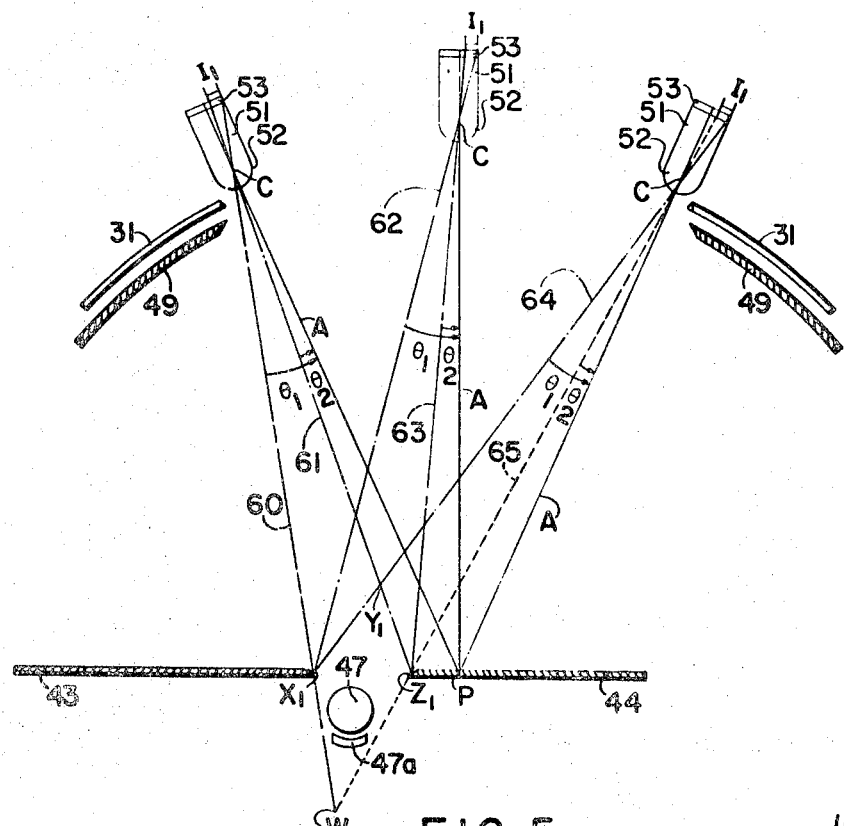
FIG. 5 is a schematic optical diagram, on exaggerated scale, showing the optics of the apparatus arrangement shown in FIG. 4.

FIG. 5 is an optical diagram explaining the optics of exposing the right one-third of the photoresponsive layer 51.

AS before, the motion of the lenticule 51 has been stopped in the left, center, and right positions as in FIG. 3. As in the previous diagram, optical light lines (60–61) have been drawn from the outermost ends of the image area selected to be exposed ($I_1$) through the center of curvature C of the lens element 52 and the distance between these lines at the point of contact with the plane that contains the center of the circle of which the arc is a part determines the positioning of an extent of the aperture between the plates 43 and 44 necessary to effect the desired photoexposure. Each light line forms an angle with the optical axis line A, these angles being noted by $\theta_1$ and $\theta_2$. As in the previous diagram, these angles are derived from the position of the image area with respect to the optical axis line.

In moving lenticule 51 to the center of the diagram, the distance between the center of curvature C and the optical axis line A has not changed so that the angles formed between the optical light lines drawn from the image area through the center of curvature C of the lens 52 of the central lenticule (Lines 62 and 63) and the optical axis line A remains the same and, in accordance with the previous discussion, equal to angle $\theta_1$ and $\theta_2$ assuming that the optical axis line is still directed toward point P. Therefore, the aperture distance between planes 43 and 44 necessary to cause photoexposure of the image area $I_1$ also remains the same.

The same relationship also applies when the lenticule has moved to the right and this can be seen by the study of light lines 64 and 65 which are drawn in a similar manner.

Figure 6:
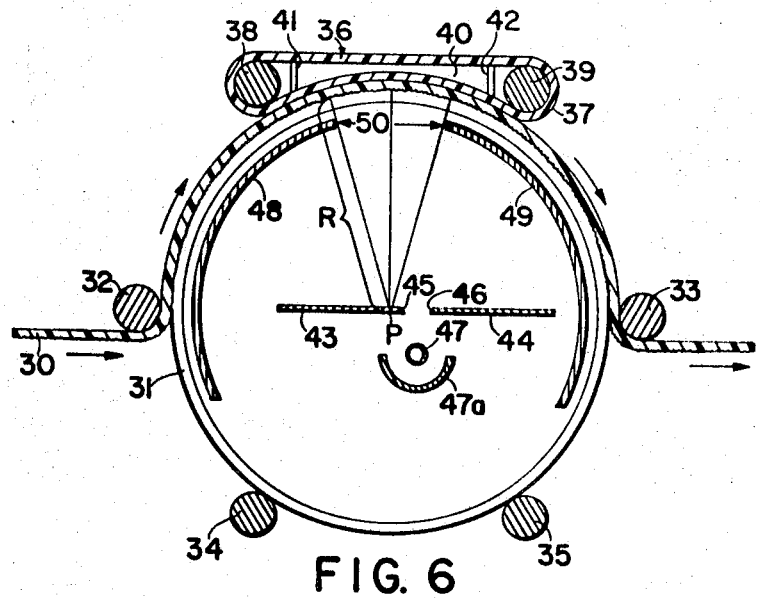
FIG. 6 is a diagrammatic cross-sectional view of the apparatus of FIG. 2 arranged for selectively imaging the left portion of a photoresponsive layer contiguous with each lenticule.
Figure 7:
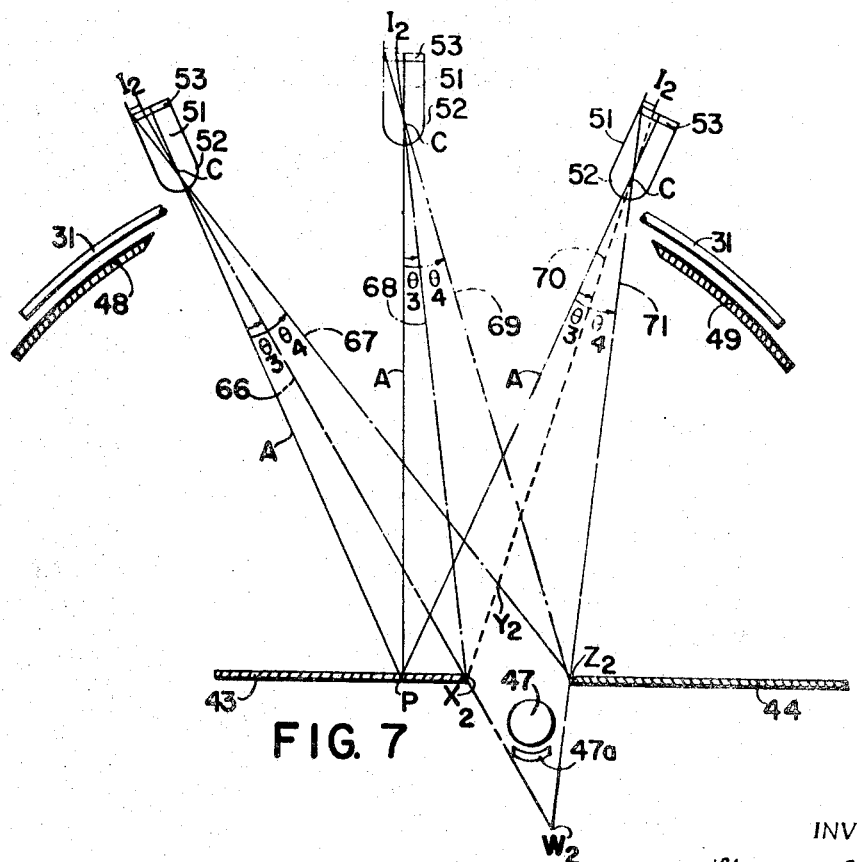
FIG. 7 is a schematic optical diagram, on exaggerated scale, showing the optics of the apparatus arrangement shown in FIG. 6.

The foregoing discussion serves with equal applicability to illustrating the determination of the aperture distance and position and the optics therefore for the exposure of the left one-third of the photoresponsive layer 33 contiguous to the lenticule 51 as depicted in FIGS. 6 and 7 wherein numerals 66, 67, 68, 69, 70, and 71 indicate light lines drawn from the outermost points of the image area $I_2$ through the center of curvature C of the lens element in the 3 positions left, center, and right of the exposure area, and $\theta_3$ and $\theta_4$ indicate angles formed similar to $\theta_1 2. \theta_1$.

As an alternate method of accomplishing exposure of the final portion of the terminal photoresponsive layer, the whole film may be flooded with light, as previously mentioned, since all other areas except the area desired to be exposed have been exposed, developed, and dyed and therefore may act as a mask effectively preventing any further photoexposure through those area.

The foregoing discussion related to exposure of three approximately equal portions of the photoresponsive layer contiguous with each lenticule. This is for purposes of discussion only as more portions, e.g., 4, or less, e.g., 2, could also be exposed in the described manner, as desired.

It will be noted that during the preceding description aperture plates 43 and 44 are positioned on a plane which includes the center of the circle of which the arc is a part and that the plane is perpendicular to a radius of the circle, which radius preferably divides the exposure area into two equal parts. It is essential that the radius which is perpendicular to the plane in which the aperture plates are located contact, the arc somewhere within the exposure area, or in other words, one radius dropped from the arc within the exposure zone must be perpendicular to the plane which includes the aperture plates and the center of the circle. If these conditions are fulfilled, then direct imaging of the exposure means will take place on the photoresponsive layer and the position of that image will be governed by the relative position of the exposure means to the optical axis lines of the lenticules.

On the basis a method of selectively and directly exposing to radiation a defined portion of photoresponsive layer contiguous with each lenticule of a moving lenticulated photoresponsive element, wherein the lenticular axis is perpendicular to the direction of motion, is provided by forming the lenticulated photoresponsive element into an arc, while the element is moving through an exposure area, so that the optical axis lines of each lenticule are directed toward the center of the circle of which the arc is a part, and exposing the element by exposure means adjustably positioned, on a plane which contains the center of the circle and which plane is perpendicular to one radius of the circle dropped from the photoresponsive element in the exposure area and passing through the center of the circle in such relationship to said optical axis lines that the positioning dictates, in a laterally reversed manner, the portion of the photoresponsive layer desired to be exposed while the element is moving through the exposure area. In a preferred form of this method, the radius bisects the exposure area.

It is to be understood that the aforedefined method may be used to successively and selectively expose desired portions of a photoresponsive layer contiguous with each lenticule of a lenticular film to produce a color screen in accordance with the method described hereinbefore.

The previously described method of the present invention for selective exposure requires that the means be selectively adjusted on a plane which includes the center of the circle of which the arc of the photoresponsive element is a part and which plane is perpendicular to one radius dropped from the element while the element is in the exposure area. While this is important for direct imaging exposure of the photoresponsive layer, it is not essential for the accomplishment of the desired end result, e.g., the selective exposure of certain areas of photoresponsive layers contiguous with each lenticule. The apparatus of the present invention may also be used to accomplish the same result in accordance with a different theory of photoexposure, e.g., that of light sweeping the desired area while the photoresponsive element is passing through the exposure area. This is accomplished by positioning the exposure means above or below the plane defined above, and by adjusting the width of the exposure means, in relation to the exposure area, such that the exposure means will image on a small portion of the area contiguous to each lenticule selected to be exposed and sweep the selected area from one extreme boundary thereof to the other while the photoresponsive element passes through the exposure zone. It has been noted that there is a relationship between the exposure area, the image area, the radius of the circle and the width of the exposure means which dictates the positioning of the exposure means above, below or across the aforedefined plane to obtain the desired sweeping action within the selected image area. The theory of this relationship will be discussed in connection with the optical diagram of FIG. 3.

Referring again to FIG. 3, and assuming that the same conditions are still applicable as in the previous discussion, the light sweeping of the image area I can be accomplished by positioning the exposure means above or below or across the plane which contains the center of the circle and adjusting the width thereof in accordance with a diamond-shaped area defined by the juncture of optical light lines drawn from the outermost points of the image areas I of the outermost lateral lenticules within the exposure area through the centers of curvature of the lens elements of the lenticules.

In FIG. 3, the diamond is identified by the letters WXYZ and defined by light lines 55 and 58 which cross at point Y and the juncture of light lines 54 and 59 at point W. The upper part of the diamond is defined by lines XY of light line 58 and YZ of light line 55 and the lower part defined by lines XW of light line 54 and ZW of light line 59. By positioning the light source means on the diamond, at for instance MN, a light line drawn from point N through the center of curvature of the left lenticule will follow the path of light line 55 and define the left outermost point of the image area I. A light line drawn from point M through the center of curvature will fall somewhere between the left outermost extreme of the image area and the right outermost extreme for the left lenticule. In moving the lenticule across the exposure area, the photoresponsive layer will be swept with light until at the outermost right extreme of the exposure area, a light line from point M through the center of curvature of the lenticule will fall on light line 58 and thereby define the outermost right extreme of the image area. A similar situation exists with regard to sweep exposure of the right one-third of the photoresponsive layer as depicted in FIG. 5, (diamond $W_1X_1Y_1Z_1$) and the left one-third as depicted in FIG. 7 DIAMOND $W_2X_2Y_2Z_2$).

The exposure means may be positioned above, below or across the aforedefined plane. For substantially full image area sweep, the exposure means must cross a line connecting the uppermost point of the diamond (point Y) and the lowermost point (point W). This is true for an exposure means positioned above, below or across the plane which contains the center of the circle.

The parameters of the diamond are thus determined by the exposure area arc, the width of the image area I and its relationship to the optical axis line and the center of curvature of the lens elements of the outermost lateral lenticules within the exposure area, and the radius of the circle of which the arc is a part, in the manner previously described.

On the basis of the foregoing discussion, a method of selectively exposing to light a defined portion of a photoresponsive layer contiguous with the smooth surface of each lenticule of a moving lenticular photoresponsive element, wherein each longitudinal lenticular axis is perpendicular to the direction of motion of the element, is provided by forming the lenticular photoresponsive element into an arc, while the element is moving through an exposure area, so that the lenticular surface of the element is directed inward of the circle and the optical axis of the lens element of each lenticule is directed toward the center of the circle during passage of the lenticule through the arc, and exposing the defined portion selected to be exposed from a source of radiation actinic to the photoresponsive layer, the source being selectively positioned within a diamond-shaped area and extending substantially from one side of the area to another side thereof across a line connecting the uppermost and lowermost points of the area, that is, the point most proximal and the point most distal to the exposure area, the area itself being defined by the juncture of optical light lines drawn from the outermost points of the defined portion within the outermost lateral lenticules within the exposure area through the centers of curvature of the lens elements of these lenticules.

The apparatus of the present invention is thus particularly adapted to accomplish the specific methods detailed hereinbefore, and thereby to provide the formation of color screen elements which may be employed as an element of a photographic film, for example, in accordance with the disclosures of the aforementioned copending U. S. application Ser. No. 276,785; *History of Color Photography*, (1944), J. S. Friedman, the American Photographic Publishing Company, Boston, Mass.; and U.S. Pat. Nos. 2,614,926; 2,726,154; 2,944,894; 3,087,815; and the like.

The apparatus of the present invention can also be modified to include multiple exposure means in a plurality of sectors of the circle in accordance with the perimeters detailed herein, which where desired, may be suitably separated from one another by opaque shields. This may be employed for multiple exposures of the same or different areas to form color screens described in the aforementioned copending U.S. application Ser. No. 276,785.

Since certain changes may be made in the above apparatus and methods without departing from the scope of the present invention, it is intended that all matter contained in the above description and/or shown in the accompanying drawings shall be interpreted as illustrative and not in a limiting sense.

I claim:
1. A method for selectively exposing to actinic radiation a portion of a photosensitive layer contiguous with the smooth surface of each lenticule of a moving lenticular photosensitive element wherein each longitudinal lenticular axis is perpendicular to the direction of motion of said element which comprises the steps of:
    a. forming said lenticular photosensitive element to an arc, while said element is moving through and exposure area, whereby the lenticular surface of said element is directed inward of the circle of which the arc is a part and the optical axis of the lens element of each lenticule is directed toward the center of said circle during passage of said lenticule through said arc,
    b. exposing the selected portion of said photosensitive layer contiguous with each lenticule during its traverse through said arc from a source of radiation actinic to said photosensitive layer, said source being selectively positioned within a diamond-shaped area to another side thereof across a line connecting the points of said area most proximal to and most distal from said exposure are, said diamond-shaped area being defined by the juncture of optical light lines drawn from the lateral extremes of the selected portions of the outermost lateral lenticules within said exposure area through the centers of curvature of the lens elements of the outermost lateral lenticules,
    c. contacting said exposed photosensitive element following exposure to said source of radiation with a solvent to provide the removal of unexposed portions of said photosensitive element, and
    d. contacting said photosensitive element with a dye to provide colored optical filter areas in exposed portions of said photosensitive element.
2. A method as defined in claim 1, wherein said lenticular element is overcoated on the surface containing said colored optical filter elements with photosensitive layer.
3. A method as defined in claim 2 wherein said photoresponsive layer following exposure to said source of radiation to expose selected portions is contacted with a suitable solvent to effect the removal of the unexposed portions of said photosensitive layer and the exposed portions are contacted with a second dye to form second colored optical filter elements.